(12) United States Patent
Visconti et al.

(10) Patent No.: US 12,449,277 B2
(45) Date of Patent: Oct. 21, 2025

(54) CIRCUIT FOR A MEMS GYROSCOPE AND METHOD FOR OPERATING A CORRESPONDING CIRCUIT

(71) Applicant: Robert Bosch GmbH, Stuttgart (DE)

(72) Inventors: Andrea Visconti, Munich (DE); Alexandru Negut, Munich (DE)

(73) Assignee: ROBERT BOSCH GMBH, Stuttgart (DE)

( * ) Notice: Subject to any disclaimer, the term of this patent is extended or adjusted under 35 U.S.C. 154(b) by 304 days.

(21) Appl. No.: 18/041,574

(22) PCT Filed: Sep. 10, 2021

(86) PCT No.: PCT/EP2021/074894
§ 371 (c)(1),
(2) Date: Feb. 14, 2023

(87) PCT Pub. No.: WO2022/053595
PCT Pub. Date: Mar. 17, 2022

(65) Prior Publication Data
US 2023/0288226 A1    Sep. 14, 2023

(30) Foreign Application Priority Data
Sep. 11, 2020 (DE) .................... 10 2020 211 467.6

(51) Int. Cl.
*G01C 19/5712* (2012.01)
*G01C 25/00* (2006.01)
(52) U.S. Cl.
CPC ......... *G01C 25/00* (2013.01); *G01C 19/5712* (2013.01)

(58) Field of Classification Search
CPC . G01C 25/00; G01C 19/5712; G01C 19/5776
See application file for complete search history.

(56) References Cited

U.S. PATENT DOCUMENTS 9,109,901 B2 *  8/2015  Fang .................... G01C 25/005
9,410,806 B2     8/2016  Ezekwe
(Continued)

FOREIGN PATENT DOCUMENTS

| DE | 102013225359 A1 | 6/2015 |
| DE | 102019118437 A1 | 1/2020 |
| JP | 2019174368 A    | 10/2019 |

OTHER PUBLICATIONS

International Search Report for PCT/EP2021/074894, Issued Dec. 23, 2021.
(Continued)

*Primary Examiner* — David J Bolduc
(74) *Attorney, Agent, or Firm* — NORTON ROSE FULBRIGHT US LLP

(57) ABSTRACT

A circuit for a MEMS gyroscope having at least one mass excitable to an oscillatory motion. The circuit includes: a signal generator circuit for generating a periodic test signal, the test signal being applicable to a first MEMS-side signal input of a driver circuit and/or to a second MEMS-side signal input of a readout circuit and causing a response measurement signal, so that the phase offset between a demodulation signal and the response measurement signal can be determined on the basis of the response measurement signal. A corresponding method for operating a MEMS gyroscope is also described.

10 Claims, 3 Drawing Sheets

(56) References Cited

U.S. PATENT DOCUMENTS

| | | | |
|---|---|---|---|
| 11,112,269 B2* | 9/2021 | Clark | G01P 21/00 |
| 11,175,138 B2* | 11/2021 | Fang | G01C 25/005 |
| 2005/0268716 A1 | 12/2005 | Hrovat et al. | |
| 2006/0150745 A1* | 7/2006 | Lang | G01C 19/5776 |
| | | | 73/849 |
| 2010/0263445 A1* | 10/2010 | Hayner | G01C 19/56 |
| | | | 73/504.12 |
| 2011/0041609 A1 | 2/2011 | Clark et al. | |
| 2011/0192226 A1* | 8/2011 | Hayner | G01C 19/5776 |
| | | | 73/504.12 |
| 2015/0057959 A1* | 2/2015 | Ezekwe | G01C 19/5776 |
| | | | 702/96 |
| 2015/0160632 A1* | 6/2015 | Buhmann | G05B 15/02 |
| | | | 700/275 |
| 2015/0377625 A1 | 12/2015 | Aaltonen | |
| 2017/0328735 A1* | 11/2017 | Beaulaton | G01C 19/5726 |
| 2018/0259334 A1 | 9/2018 | Moriguchi | |
| 2019/0265036 A1 | 8/2019 | Arndt et al. | |
| 2019/0277656 A1 | 9/2019 | Painter et al. | |
| 2020/0400433 A1* | 12/2020 | Aaltonen | G01C 19/5712 |
| 2020/0408524 A1* | 12/2020 | Hu | G01C 19/5776 |
| 2020/0408526 A1* | 12/2020 | Matsudaira | H10D 48/50 |
| 2021/0278213 A1* | 9/2021 | Aaltonen | G01C 19/5776 |

OTHER PUBLICATIONS

Balachandran et al., "A 3-AXIS Gyroscope for Electronic Stability Control With Continuous Self-Test," IEEE Journal of Solid-State Circuits, IEEE, vol. 51, No. 1, 2016, pp. 177-186.

* cited by examiner existing art existing art

CIRCUIT FOR A MEMS GYROSCOPE AND METHOD FOR OPERATING A CORRESPONDING CIRCUIT

FIELD

The present invention relates to a circuit for a MEMS gyroscope and a method for operating a corresponding circuit. In particular, the present invention relates to a circuit and to a method for ascertaining a phase offset in an operating circuit of a MEMS gyroscope.

BACKGROUND INFORMATION

One of the most important properties of a MEMS (Micro-Electro-Mechanical System) gyroscope is its offset stability as a function of temperature, load, and service life. The main contribution of the output offset in a gyroscope is the quadrature signal generated by the mechanical structure, which is then demodulated to the baseband with a demodulation signal that is not perfectly aligned in phase with the rate signal. This is generally due to a phase offset between the drive signal derived from the mechanical drive motion, which signal is used to retrieve the synchronicity within the circuitry for the operation of the MEMS gyroscope, and the rate and quadrature signals provided by the readout part of the gyroscope mechanism. The quadrature signal results from an asymmetry of the MEMS gyroscope due to production. This causes oscillations not only in the drive direction, but also in the detection direction (read direction). These oscillations have a 90° phase offset to each other.

A basic breakdown of delays is shown in FIG. 1 and in FIG. 2 for an example architecture, a path for quadrature compensation being added in FIG. 2.

Usually, the remaining output offset in the digital data path is compensated by summing the quadrature signal with the rate signal using a suitably chosen coefficient, which ideally represents a phase offset. An example of this technique is described e.g. in U.S. Pat. No. 9,410,806 B2 and U.S. Patent Application Publication No. US 2019/0265036 A1.

To obtain a good compensation, the coefficients named above must be calculated. This is possible:

Empirically, by adjusting the offset measured as a function of temperature: The disadvantage is the need for temperature measurements in production, which are usually not acceptable for the consumer market due to cost and quantity considerations.

With a prediction of the behavior of the offset as a function of temperature, based on an appropriate number of samples measured as a function of temperature, and a measurement of the factors influencing the phase offset at room temperature, where possible.

The problem with existing approaches is that the measurement of the factors influencing the phase offset is usually limited to indirect measurements, which can lead to a significant error compared to the precision required by the increasingly stringent requirements placed on gyroscopes.

SUMMARY

According to the present invention, a circuit for operating a MEMS gyroscope having at least one mass excitable to an oscillatory motion is provided. According to an example embodiment of the present invention, the circuit includes at least:

a) a driver circuit with a first MEMS-side signal input for monitoring the oscillatory motion of the mass, the driver circuit including a phase-locked loop that follows the oscillatory motion of the mass, and the drive circuit being configured to generate a drive signal for exciting and maintaining a defined drive oscillation of the mass, b) a readout circuit having a second MEMS-side signal input for acquiring deflections of the mass in a detection direction and for converting the deflections into an electrical measurement signal,
    the readout circuit being configured to generate a useful signal and a quadrature signal from the measurement signal by demodulating the measurement signal using at least one demodulation signal provided by the phase-locked loop, c) a signal generator circuit for generating a periodic test signal,
    wherein the test signal can be applied to the first MEMS-side signal input of the driver circuit and/or to the second MEMS-side signal input of the readout circuit and produces a response measurement signal, so that the phase offset between the demodulation signal and the response measurement signal can be determined on the basis of the response measurement signal.

The measurement of the phase offset is realized thanks to a signal generator circuit that generates a preferably sinusoidal signal, which is then applied to the inputs of both the read circuit and the driver circuit.

The present invention described makes it possible:

to accurately characterize the phase offset of the circuit without support by external devices.

to be able to estimate the correction coefficient for the offset compensation more accurately.

to create the possibility of measuring the phase offset at the user side as well, using an automatic built-in procedure, and finally to update the coefficients used for the offset correction.

Phase offset is also called phase shift.

According to an example embodiment of the present invention, preferably, the signal generator circuit can be selectively activated and switched off/deactivated.

According to an example embodiment of the present invention, preferably, a phase offset is determined temporally directly from the demodulation signal and the response measurement signal. Alternatively, demodulation signals and response measurement signals are stored as a function of time, in which case a phase offset can be determined at a later time. Here, for example, measurements can be made by one person and then at a later time the phase offset can be determined by another person.

According to an example embodiment of the present invention, preferably, the signal generator circuit is configured to generate a sinusoidal test signal and/or configured to generate a test signal having the expected frequency of the drive oscillation.

The simplest solution in terms of the signal to be applied would be to use either a square wave or a triangular signal. However, since the real signal coming from the MEMS gyroscope is a sinusoidal signal, a sinusoidal signal should be used to obtain the same behavior of the circuits as in normal operation (measurement operation) and thus a more reliable measurement.

According to an example embodiment of the present invention, preferably, the signal generator circuit comprises an oscillator circuit and/or a function generator.

An oscillator circuit is an electronically realized oscillator (therefore also called an oscillator for short) for generating a sinusoidal alternating voltage, and a function generator is a device for generating periodic electrical signals with different waveforms, in particular sine, square, triangle, and sawtooth, with adjustable frequency (usually up to a few MHz) and amplitude.

According to an example embodiment of the present invention, preferably, the readout circuit has at least two analog-digital converters for converting an analog in-phase signal and/or for converting an analog quadrature-phase signal into corresponding digital signals.

Digital signals can be more easily processed by a control means (i.e., control element) that is connectable to the circuit according to the present invention. This could be a computer or a microcontroller.

Preferably, the circuit according to an example embodiment of the present invention has at least two capacitance-to-voltage converters for converting capacitance values received from the MEMS gyroscope into voltage signals.

According to an example embodiment of the present invention, preferably, a quadrature compensation circuit is provided for the compensation of a quadrature error in the analog measurement signal, the quadrature compensation circuit generating an analog quadrature compensation signal based on the MEMS-side input signal of the driver circuit, which compensation signal is applied to the measurement signal before the demodulation.

When the quadrature compensation signal is applied, the quadrature signal is preferably reduced, more preferably cancelled.

Preferably, the circuit according to an example embodiment of the present invention is implemented as an integrated circuit, more preferably as an application-specific integrated circuit (ASIC, also: custom chip).

According to an example embodiment of the present invention, preferably, the driver circuit has an amplitude controller, the amplitude controller adjusting the amplitude of the defined drive oscillation of the mass.

According to an example embodiment of the present invention, preferably, control means (i.e., control element(s)) are provided in the circuit according to the present invention for selecting an operating mode from a plurality of specified operating modes, which include at least:
  a measurement mode, in which the signal generator circuit does not provide a test signal and in which the MEMS gyroscope provides input signals to the first MEMS-side signal input of the driver circuit and to the second MEMS-side signal input of the readout circuit, and
  a test mode, in which the MEMS gyroscope does not provide input signals to the driver circuit and to the readout circuit, and in which the signal generator circuit provides a test signal to the first MEMS-side signal input of the driver circuit and/or to the second MEMS-side signal input of the readout circuit.

A method according to an example embodiment the present invention for operating a circuit according to the present invention in a test mode fundamentally includes the following steps:
  a) Deactivating the MEMS gyroscope,
  b) Applying a periodic test signal generated by the signal generator circuit to the first MEMS-side signal input of the driver circuit and/or to the second MEMS-side signal input of the readout circuit, thereby causing a response measurement signal,
  c) Demodulation of the response measurement signal using a demodulation signal provided by the phase-locked loop of the driver circuit.

According to an example embodiment of the present invention, preferably, deactivating the MEMS gyroscope means that the MEMS gyroscope does not provide input signals to the driver circuit and to the readout circuit. Therefore, either the connection could be interrupted and/or the actual MEMS gyroscope could be switched off. The deactivation of the MEMS gyroscope is required in order to ascertain only the influences of the circuit according to the present invention itself on a periodic known signal.

According to an example embodiment of the present invention, preferably, during the demodulation of the response measurement signal a response useful signal is generated, and the phase offset between the demodulation signal and the response measurement signal is determined on the basis of the response useful signal.

Preferably, in a circuit according to an example embodiment of the present invention, if the circuit has a quadrature compensation circuit for compensating a quadrature error in the analog measurement signal, the periodic test signal is applied only to the first MEMS-side signal input of the driver circuit and not to the MEMS-side input of the readout circuit, and the contribution of the quadrature compensation circuit to the phase offset between the demodulation signal and the response measurement signal is determined on the basis of the response useful signal thus obtained.

According to an example embodiment of the present invention, preferably, the phase offset between demodulation signal and response measurement signal determined in the test mode is used as a basis for a calibration and/or recalibration of a MEMS gyroscope, in particular an offset compensation of a MEMS gyroscope.

According to an example embodiment of the present invention, preferably, a regular and/or automatic calibration of the MEMS gyroscope takes place.

According to another aspect of the present invention, a system is provided including a MEMS gyroscope and a circuit according to the present invention for operating the MEMS gyroscope.

According to another aspect of the present invention, a computer program is provided having instructions that cause the circuit according to the present invention to carry out the method according to the present invention.

The various specific example embodiments and aspects of the present invention disclosed herein can be advantageously combined with each other, unless otherwise stated in the individual case. In particular, representations and descriptions of preferred realizations and specific embodiments of the method are always correspondingly transferable to the device, the system, and the computer program, and vice versa.

Advantageous further developments of the present invention are disclosed herein.

BRIEF DESCRIPTION OF THE DRAWINGS

Exemplary embodiments of the present invention are shown on the basis of the figures and are explained in more detail in the following description.

DETAILED DESCRIPTION OF EXAMPLE EMBODIMENTS

Figure 1:
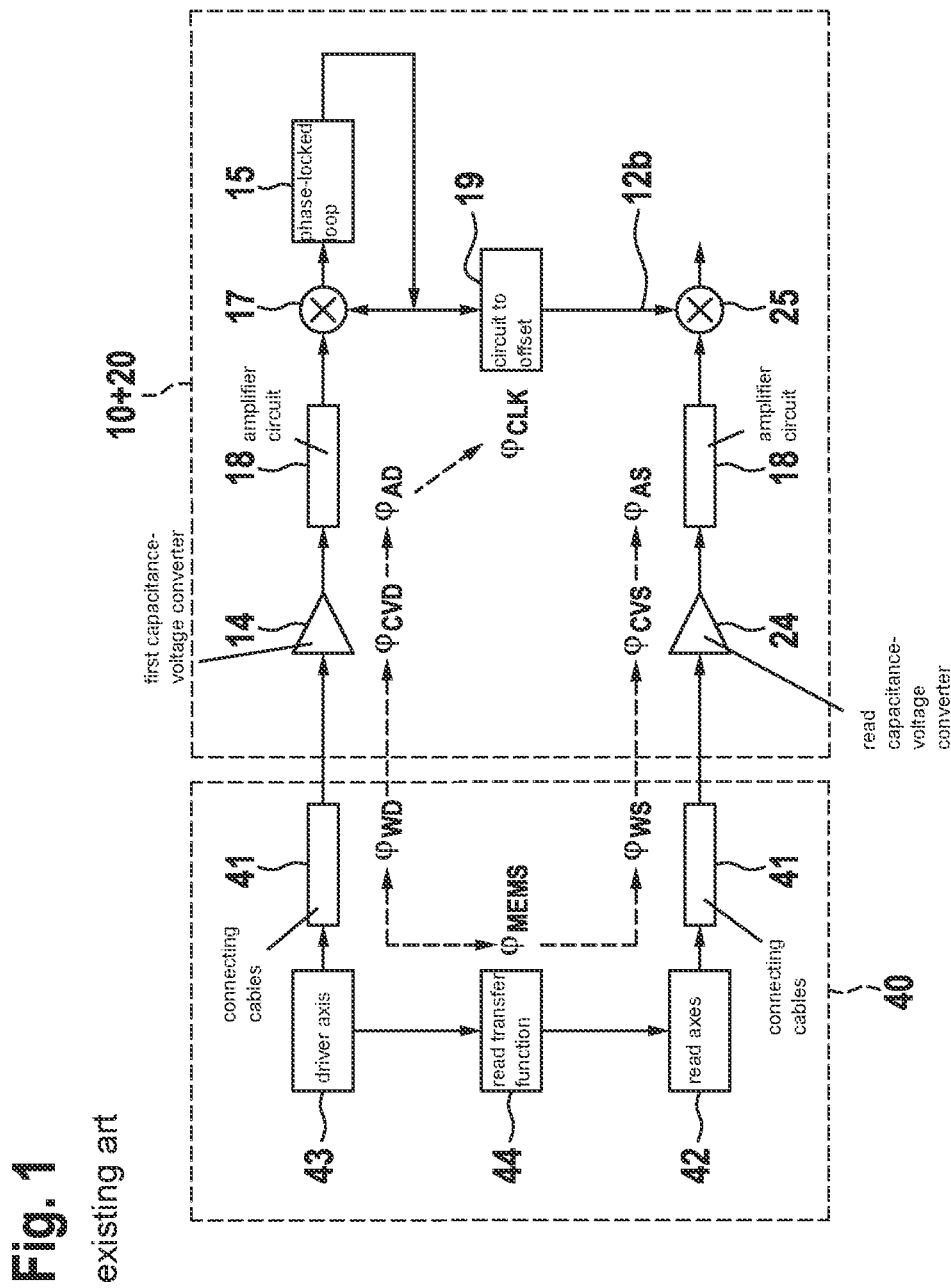
FIG. 1 shows a block diagram of a MEMS gyroscope with a circuit for operating the gyroscope according to the existing art.
Figure 2:
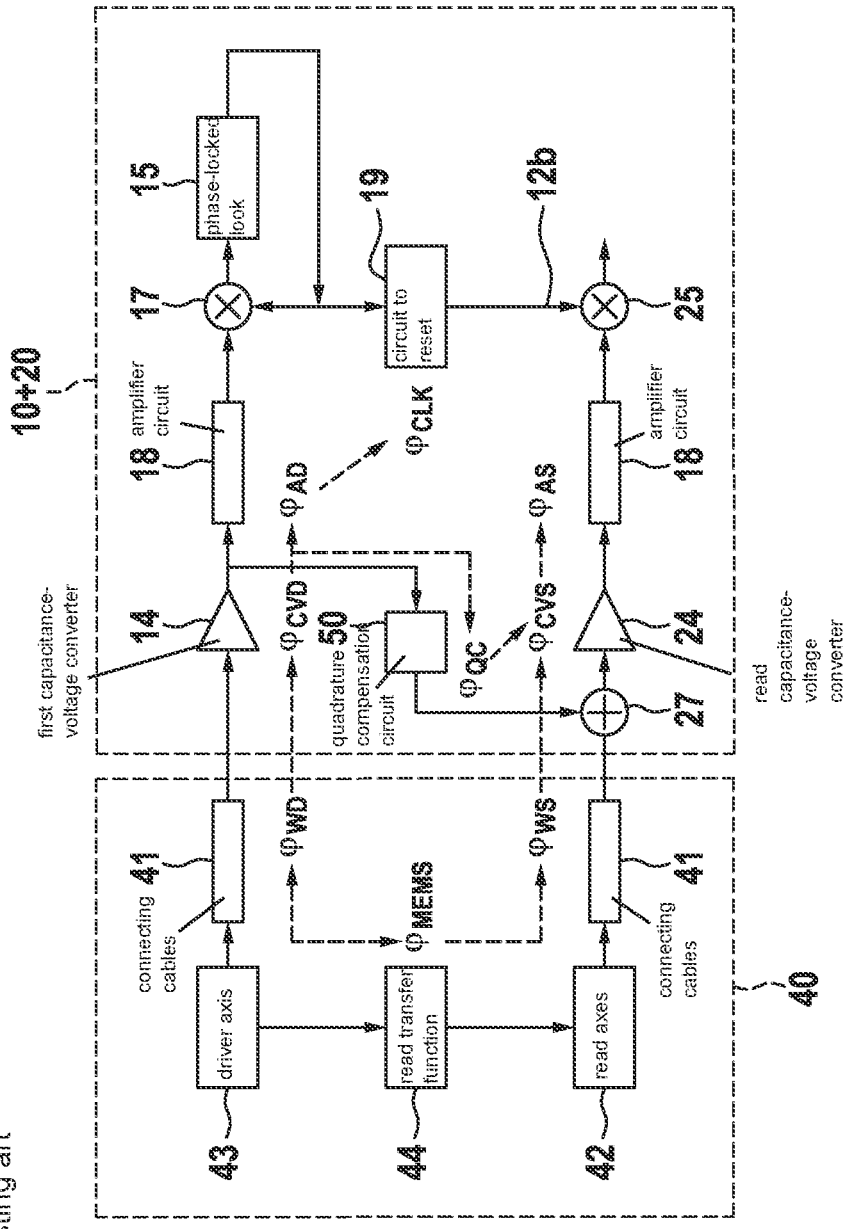
FIG. 2 shows another block diagram of a MEMS gyroscope with a circuit for operating the gyroscope according to the existing art, having a quadrature compensation circuit.

FIGS. 1 and 2 show block diagrams of a MEMS gyroscope 40 having a circuit 10, 20 for operating the gyroscope according to the related art. The MEMS gyroscope includes a driver axis 43, a plurality of read axes 42, and a read transfer function 44. MEMS gyroscope 40 is connected to operating circuit 10, 20 via connecting cables 41 on the driver side and on the read side. The driver side of MEMS gyroscope 40 is connected to a first capacitance-voltage converter 14, and the read side is connected to a second capacitance-voltage converter 24. First capacitance-voltage converter 14 is connected to a demodulator 17 via an optional amplifier circuit 18, and second capacitance-voltage converter 24 is connected to a demodulator 25 via an optional amplifier circuit 18. Demodulator 17 is connected to a phase-locked loop 15, and, via a circuit 19 that offsets the phase of incoming signals by 90°, is connected to demodulator 25.

Based on the example architecture shown in FIG. 1, the phase offset error of the system of MEMS gyroscope 40 and operating circuit 10, 20 is defined as the delay at rate demodulator 25 between demodulation clock pulse 12b from phase-locked loop 15 and the signal to be demodulated coming from MEMS gyroscope 40:

$$\varphi_{driver} = \varphi_{WD} + \varphi_{CVD} + \varphi_{AD} + \varphi_{CLK}$$

$$\varphi_{read} = \varphi_{MEMS} + \varphi_{WS} + \varphi_{CVS} + \varphi_{AS}$$

$$\varphi_{error} = \varphi_{driver} - \varphi_{read}$$

Here $\varphi_{MEMS}$ is the delay introduced by the read-transfer function 44 of the MEMS gyroscope, while $\varphi_{WD}$ and $\varphi_{WS}$ are the delays introduced by wiring 41 between the MEMS electrodes and the input of circuit 10, 20 for driver path 43 and read path 42, respectively. These expressions are inherent to the mechanical part of the gyroscope, and their estimation is not part of the present invention.

The terms associated with the operating circuit 10, 20 are: $\varphi_{CVD}$ and $\varphi_{CVS}$, delays of driver capacitance-voltage converter 14 and read capacitance-voltage converter 24 (or amplifier circuit 18), $\varphi_{AD}$ and $\varphi_{AS}$, delays of operating circuit 10, 20 between amplifier circuit 18 and the demodulation for drive 17 or scanning 25, respectively, and $\varphi_{CLK}$, the delay of the demodulation signals due to circuit 19 between the phase reference point of phase-locked loop 15 and rate demodulator 25.

In the architecture shown in drawing 2, there is the additional term $\varphi_{QC}$, which is the delay of an additional quadrature compensation circuit 50 that introduces an additional delay path:

$$\varphi_{compensation} = \varphi_{WD} + \varphi_{CVD} + \varphi_{QC} + \varphi_{CVS} + \varphi_{AS}$$

The phase shifts that affect only operating circuit 10, 20 are:

$$\varphi_{Adriver} = \varphi_{CVD} + \varphi_{AD} + \varphi_{CLK}$$

$$\varphi_{Aread} = \varphi_{CVS} + \varphi_{AS}$$

$$\varphi_{Acompensation} = \varphi_{CVD} + \varphi_{QC} + \varphi_{CVS} + \varphi_{AS}$$

It would be possible to measure the operating circuit 10, 20 related part of the phase delays by applying an identical periodic signal to the input of driver circuit 10 and read circuit 20. This periodic signal would be read by driver circuit 10, thereby disabling phase-locked loop 15 and generating demodulation signal 12b. On the side of read circuit 20, it would be a quadrature signal and would then be demodulated by rate demodulator 25. Thus, the output of the rate path would be:

Rate=Quadrature*sin($\varphi_S$)

Figure 3:
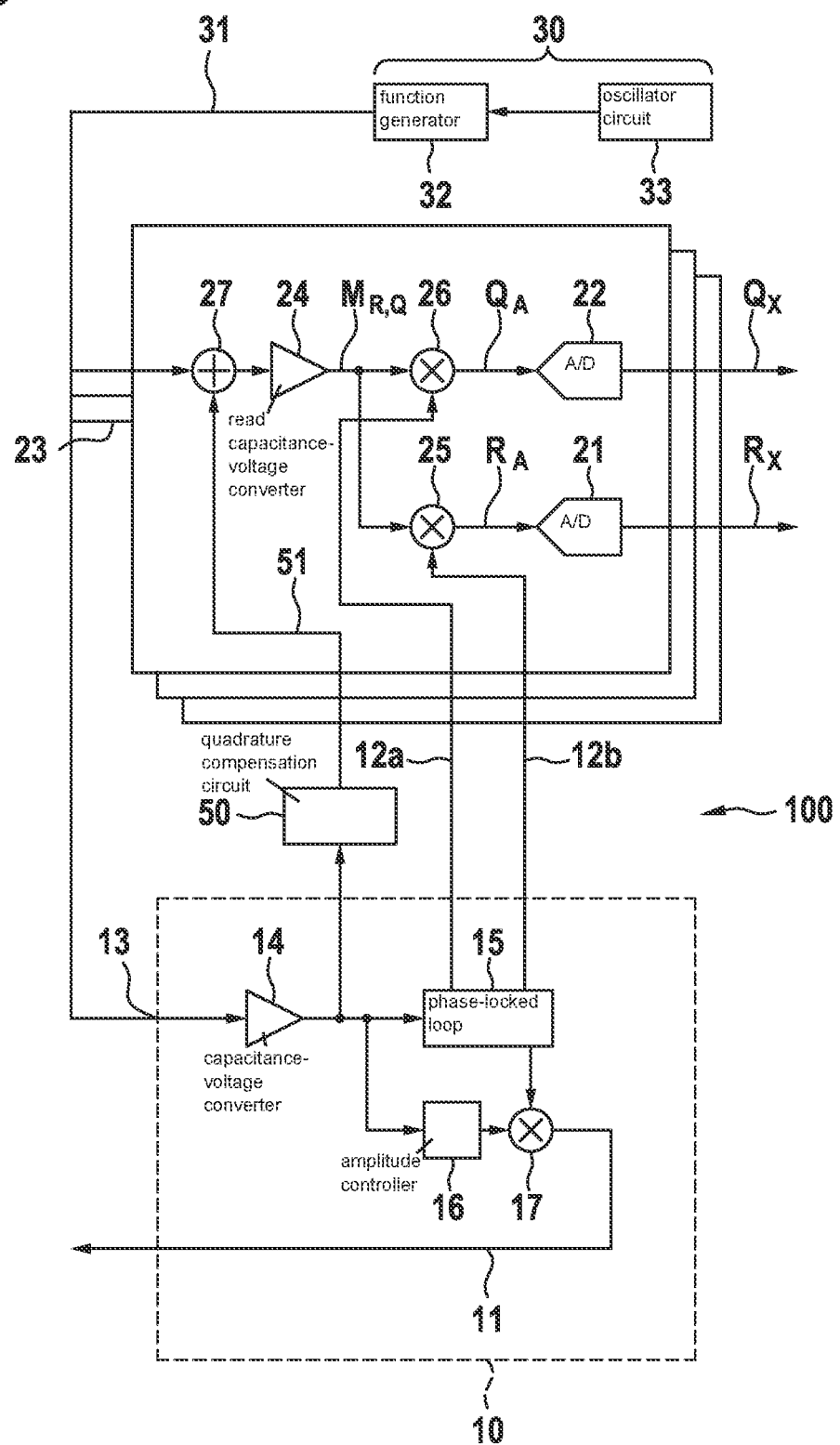
FIG. 3 shows a block diagram of a specific example embodiment of the circuit according to the present invention.

Therefore, if the input signal (quadrature) is known, the total phase delay $\varphi_S$ of operating circuit 10, 20 could be determined. FIG. 3 shows a block diagram of a specific embodiment of circuit 100 according to the present invention for ascertaining a phase offset in an operating circuit 10, 20 of a MEMS gyroscope.

Circuit 100 according to the present invention includes a driver circuit 10, a read circuit 20, a signal generator circuit 30, and optionally a quadrature compensation circuit 50. Driver circuit 10 includes a capacitance-voltage converter 14, a phase-locked loop 15, an amplitude controller 16, and a modulator 17. Driver circuit 10 includes at least three outputs and one input 13. Read circuit 20 includes a capacitance-voltage converter 24, two demodulators 25, 26, two analog-digital converters 21, 22, and optionally a signal adder 27. A MEMS gyroscope 40 can have multiple axes of oscillation (generally: x, y, and z). One read circuit 20 is required per oscillation axis. In FIG. 3, only one read circuit 20 is shown as an example. Read circuit 20 has an input 23 for an oscillation axis of MEMS gyroscope 40 and outputs for rate signal $R_x$ and quadrature signal $Q_x$. Signal generator circuit 30 includes an oscillator circuit 33 and a function generator 32, which generate a periodic signal 31.

The simplest solution with respect to the signal to be applied would be to use either a square wave signal or a triangular wave signal. However, since the real signal coming from MEMS gyroscope 40 is a sinusoidal signal, a sinusoidal signal should be used to obtain the same behavior of circuits 10, 20 as in normal operation, and thus a more reliable measurement.

Phase-locked loop 15 of driver circuit 10 provides demodulation signals 12b and 12a to demodulators 25, 26 of read circuit 20 respectively, signals 12a and 12b having a phase offset of 90° from each other. The signals arriving at input 23 of read circuit 20 are provided, optionally via signal adder 27, to capacitance-voltage converter 24. Capacitance-voltage converter 24 generates a measurement signal $M_{R,Q}$ from the signals provided to it. Measurement signal $M_{R,Q}$ is provided to demodulator 25 together with demodulation signal 12b, and measurement signal $M_{R,Q}$ is provided to demodulator 26 together with demodulation signal 12a. Demodulator 25 generates a useful signal (rate signal) $R_A$ from measurement signal $M_{R,Q}$ and demodulation signal 12b, and demodulator 26 generates a quadrature signal QA from measurement signal $M_{R,Q}$ and demodulation signal 12a. Useful signal $R_A$ is provided to analog-digital converter 21, and this converter generates a digital in-phase signal $R_X$ therefrom, and quadrature signal QA is provided to analog-digital converter 22, and this converter generates a digital quadrature-phase signal $Q_X$ therefrom. The signals $R_X$ and $Q_X$ are provided at outputs of readout circuit 20.

The signals arriving at input 13 of driver circuit 10 are provided to capacitance-voltage converter 14. Capacitance-to-voltage converter 14 generates voltage signals from the signals provided to it, which voltage signals are provided to amplitude controller 16, phase-locked loop 15, and optionally to quadrature compensation circuit 50. Phase-locked loop 15 and amplitude controller 16 together generate, via a modulator 17 connected to them, driver signal 11 for exciting and maintaining a defined excitation oscillation of the mass of MEMS gyroscope 40 based on the voltage signals provided to them. The optional quadrature compensation circuit 50 generates an analog quadrature compensation signal 51 from the voltage signal of capacitance-voltage converter 14, which compensation signal is provided to optional signal adder 27 together with the signals arriving at input 23 of read circuit 20. In the ideal case, quadrature compensation signal 51 fully compensates the quadrature components of the signal coming in at input 23. In reality, however, portions are left over.

Periodic signal 31 is connected to input 13 of driver circuit 10 and/or to input 23 of read circuit 20. Periodic signal 31 is preferably accurately matched to the drive signal of MEMS gyroscope 40.

The application of such a sinusoidal signal 31 to both driver input 13 and read input 23 enables the measurement of the total phase demodulation error introduced by circuits 10, 20, without quadrature compensation 50:

$$\varphi_{Aerror} = \varphi_{Aread} - \varphi_{Adriver} = \varphi_{CVS} + \varphi_{AS} - (\varphi_{CVD} + \varphi_{AD} + \varphi_{CLK})$$

If periodic signal 31 is applied only to input 13 of the driver circuit with active quadrature compensation 50, it enables the measurement of the phase demodulation error introduced by circuits 10, 20 on the quadrature compensation path:

$$\varphi_{AerrorQC} =$$
$$\varphi_{Acompensation} - \varphi_{Adriver} = \varphi_{CVD} + \varphi_{QC} + \varphi_{CVS} + \varphi_{AS} - (\varphi_{CVD} + \varphi_{AD} + \varphi_{CLK}) =$$
$$\varphi_{QC} + \varphi_{CVS} + \varphi_{AS} - \varphi_{AD} - \varphi_{CLK}$$

If circuits 10, 20, and optionally circuit 50, are realized together as an ASIC, they can be carried out in any test environment and even at the user side, where the measurement can then be used with a digital routine to update the compensation coefficients of the rate shift correction.

Although the present invention has been illustrated and described in detail on the basis of preferred exemplary embodiments, the present invention is not limited by the disclosed examples and other variations may be derived therefrom by those skilled in the art without departing from the scope of the present invention.

What is claimed is:

1. A circuit for a MEMS gyroscope having at least one mass excitable to an oscillatory motion, the circuit comprising:
    a) a driver circuit having a first MEMS-side signal input, the driver circuit configured to monitor the oscillatory motion of the mass, the driver circuit including a phase-locked loop that follows the oscillatory motion of the mass, and the driver circuit being configured to generate a driver signal for exciting and maintaining a defined excitation oscillation of the mass;
    b) a readout circuit having a second MEMS-side signal input, the readout circuit configured to detect deflections of the mass in a detection direction and to convert the deflections into an electrical measurement signal, the readout circuit being configured to generate from the measurement signal a useful signal and a quadrature signal, in that the measurement signal is demodulated using at least one demodulation signal provided by the phase locked loop; and
    c) a signal generator circuit configured to generate a periodic test signal, the test signal being applicable to the first MEMS-side signal input of the driver circuit and/or to the second MEMS-side signal input of the readout circuit, and causing a response measurement signal, so that a phase offset between the demodulation signal and the response measurement signal can be determined based on the response measurement signal,
    wherein the phase-locked loop provides demodulation signals to the readout circuit, wherein the demodulation signals have a phase offset of 90° from each other, and wherein the readout circuit generates a digital in-phase signal and a digital quadrature-phase signal from the useful and quadrature signals, respectively.

2. The circuit as recited in claim 1, wherein the signal generator circuit is selectively activatable and deactivatable.

3. The circuit as recited in claim 1, wherein the signal generator circuit is configured to generate a sinusoidal test signal and/or is configured to generate a test signal having an expected frequency of a drive oscillation.

4. The circuit as recited in claim 1, wherein a quadrature compensation circuit is provided for compensating a quadrature error in the measurement signal, the quadrature compensation circuit generating, based on the MEMS-side input signal of the driver circuit, an analog quadrature compensation signal that is applied to the measurement signal before the demodulation.

5. The circuit as recited in claim 1, wherein the circuit is an integrated circuit.

6. The circuit as recited in claim 1, further comprising:
    control elements configured to select an operating mode from a plurality of predetermined operating modes that include at least:
        a measurement mode, in which the signal generator circuit does not provide any test signal and in which the MEMS gyroscope provides input signals to the first MEMS-side signal input of the driver circuit and to the second MEMS-side signal input of the readout circuit, and
        a test mode, in which the MEMS gyroscope does not provide any input signals to the driver circuit or to the readout circuit and in which the signal generator circuit provides the test signal to the first MEMS-side signal input of the driver circuit and/or to the second MEMS-side signal input of the readout circuit.

7. A method for operating a MEMS gyroscope in a test mode, the MEMS gyroscope having at least one mass excitable to an oscillatory motion and being equipped with a circuit including:
    a) a driver circuit having a first MEMS-side signal input, the driver circuit configured to monitor the oscillatory motion of the mass, the driver circuit including a phase-locked loop that follows the oscillatory motion of the mass, and the driver circuit being configured to generate a driver signal for exciting and maintaining a defined excitation oscillation of the mass;
    b) a readout circuit having a second MEMS-side signal input, the readout circuit configured to detect deflections of the mass in a detection direction and to convert the deflections into an electrical measurement signal, the readout circuit being configured to generate from the measurement signal a useful signal and a quadrature signal, in that the measurement signal is demodulated using at least one demodulation signal provided by the phase locked loop; and c) a signal generator circuit configured to generate a periodic test signal, the test signal being applicable to the first MEMS-side signal input of the driver circuit and/or to the second MEMS-side signal input of the readout circuit, and causing a response measurement signal, so that a phase offset between the demodulation signal and the response measurement signal can be determined based on the response measurement signal;

the method comprising:

deactivating the MEMS gyroscope;

applying the periodic test signal generated by the signal generator circuit to the first MEMS-side signal input of the driver circuit and/or to the second MEMS-side signal input of the readout circuit, thereby causing a response measurement signal; and demodulating the response measurement signal using the demodulation signal provided by the phase-locked loop of the driver circuit, wherein the phase-locked loop provides demodulation signals to the readout circuit, wherein the demodulation signals have a phase offset of 90° from each other, and wherein the readout circuit generates a digital in-phase signal and a digital quadrature-phase signal from the useful and quadrature signals, respectively.

8. The method as recited in claim 7, wherein a response useful signal is generated during the demodulation of the response measurement signal, and the phase offset between the demodulation signal and the response measurement signal is determined based on the response useful signal.

9. The method as recited in claim 7, wherein the circuit includes a quadrature compensation circuit configured to compensate a quadrature error in the measurement signal, wherein the periodic test signal is applied only to the first MEMS-side signal input of the driver circuit and not to the MEMS-side input of the readout circuit, and a contribution of the quadrature compensation circuit to the phase offset between demodulation signal and response measurement signal is determined based on the response useful signal thus obtained.

10. The method as recited in claim 7, wherein the phase offset, determined in the test mode, between the demodulation signal and the response measurement signal is used as a basis for a calibration and/or recalibration of the MEMS gyroscope, including an offset compensation of the MEMS gyroscope.

* * * * *